(12) United States Patent
Nathan et al.

(10) Patent No.: US 9,129,181 B1
(45) Date of Patent: Sep. 8, 2015

(54) OBJECT DETECTION, LOCATION, AND/OR TRACKING WITH CAMERA AND LIGHTING SYSTEM

(75) Inventors: Vaidhi Nathan, San Jose, CA (US);
Anoo Nathan, San Jose, CA (US)

(73) Assignee: Vaidhi Nathan, San Jose, CA (US)

( * ) Notice: Subject to any disclaimer, the term of this patent is extended or adjusted under 35 U.S.C. 154(b) by 262 days.

(21) Appl. No.: 13/412,475

(22) Filed: Mar. 5, 2012

Related U.S. Application Data

(60) Provisional application No. 61/464,521, filed on Mar. 3, 2011.

(51) Int. Cl.
*G06K 9/00* (2006.01)
*G06K 9/32* (2006.01)
*H04N 7/18* (2006.01)

(52) U.S. Cl.
CPC .................... *G06K 9/3241* (2013.01)

(58) Field of Classification Search
USPC ......... 382/100, 103, 106–107, 113–114, 123, 382/155, 162, 168, 173, 181, 193, 199, 203, 382/209, 232, 254, 274, 276, 286–291, 305, 382/312; 348/162, 143; 119/419; 235/440; 600/33; 404/12
See application file for complete search history.

(56) References Cited

U.S. PATENT DOCUMENTS

| | | | |
|---|---|---|---|
| 7,708,493 B2 * | 5/2010 | Jung et al. ...................... | 404/12 |
| 2003/0095186 A1 * | 5/2003 | Aman et al. ................... | 348/162 |
| 2007/0268366 A1 * | 11/2007 | Raskar et al. ................. | 348/143 |
| 2012/0085291 A1 * | 4/2012 | Conger et al. ................ | 119/419 |
| 2013/0092736 A1 * | 4/2013 | Moran et al. .................. | 235/440 |
| 2013/0096369 A1 * | 4/2013 | Folkers .......................... | 600/33 |

* cited by examiner

*Primary Examiner* — Seyed Azarian
(74) *Attorney, Agent, or Firm* — David Lewis

(57) ABSTRACT

A method and system for monitoring objects senses, by an electromagnetic sensor, ambient electromagnetic radiation including at least a particular frequency band reflected from a marker on the object. Data is transmitted about the ambient electromagnetic radiation to a tracking system including at least one memory system and a processor having at least one processor. The processor system determines data representing the marker, the data representing the marker being derived from the data about the ambient electromagnetic radiation. The processor system also determines a location of the object based on the data representing the marker.

18 Claims, 11 Drawing Sheets

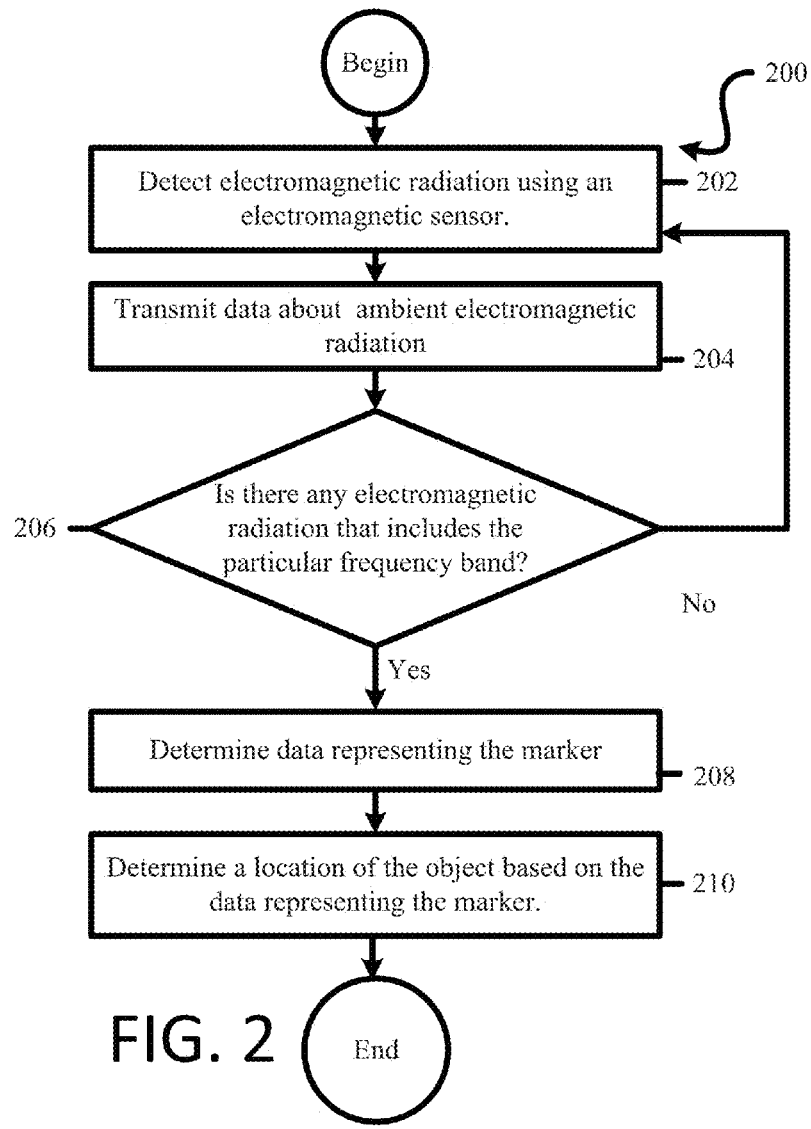

US 9,129,181 B1

OBJECT DETECTION, LOCATION, AND/OR TRACKING WITH CAMERA AND LIGHTING SYSTEM

CROSS-REFERENCE TO RELATED APPLICATIONS

This application claims priority of U.S. Provisional Patent Application No. 61/464,521, entitled "Object location and tracking with camera and lighting system," filed Mar. 3, 2011, by Anoo Nathan, which is incorporated herein by reference. U.S. Provisional Patent Application No. 61/458,978, entitled "Object tracking with camera and light system," filed Dec. 3, 2010, by Vaidhi Nathan, is also incorporated herein by reference.

FIELD

This specification generally relates to object monitoring systems using a camera and lighting system.

BACKGROUND

The subject matter discussed in the background section should not be assumed to be prior art merely as a result of its mention in the background section. Similarly, a problem and the understanding of the causes of a problem mentioned in the background section or associated with the subject matter of the background section should not be assumed to have been previously recognized in the prior art. The subject matter in the background section may merely represents different approaches, which in and of themselves may also be inventions.

Systems that rely solely on the power of image analysis may suffer from significant error. In order to analyze objects, one must first be able to identify those objects. Without an effective way to emphasize objects of interest in a data set, selectively detecting those objects of interest can be problematic. This can lead to problems when a large amount of data must be monitored, and there is no way to determine which of the data are relevant to a particular inquiry. Without adequate automation, processes can be too difficult to accomplish with a limited human workforce.

BRIEF DESCRIPTION OF THE FIGURES

In the following drawings like reference numbers are used to refer to like elements. Although the following figures depict various examples of the invention, the invention is not limited to the examples depicted in the figures.

FIG. 2 shows a flowchart of an embodiment of a method of monitoring objects, implemented by control and analysis routines, in which electromagnetic radiation can be used to help detect and locate objects.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1-8C is a brief description of each element, which may have no more than the name of each of the elements in the one of FIGS. 1-8C that is being discussed. After the brief description of each element, each element is further discussed in numerical order. In general, each of FIGS. 1-8C is discussed in numerical order and the elements within FIGS. 1-8C are also usually discussed in numerical order to facilitate easily locating the discussion of a particular element. Nonetheless, there is no one location where all of the information of any element of FIGS. 1-8C is necessarily located. Unique information about any particular element or any other aspect of any of FIGS. 1-8C may be found in, or implied by, any part of the specification.

This application incorporates herein by reference in U.S. Pat. No. 8,075,499, by Vaidhi Nathan et al., patented Dec. 13, 2011 (which teaches the detection of abnormal behavior, such as epilepsy), U.S. Provisional Patent Application Ser. No. 60/898,472, filed Jan. 30, 2007, Provisional Patent Application Ser. No. 60/898,603, filed Jan. 30, 2007, Utility patent application Ser. No. 12/011,705, filed Jan. 28, 2008, and Utility patent application Ser. No. 12/072,186 (which teaches stitching images together to form a single image). Provisional Patent Application Ser. No. 60/898,472, filed Jan. 30, 2007, Provisional Patent Application Ser. No. 60/898,603, Utility patent application Ser. No. 12/011,705 include teachings that related to background and foreground extraction, which are useable in conjunction with the methods taught herein.

Figure 1A:
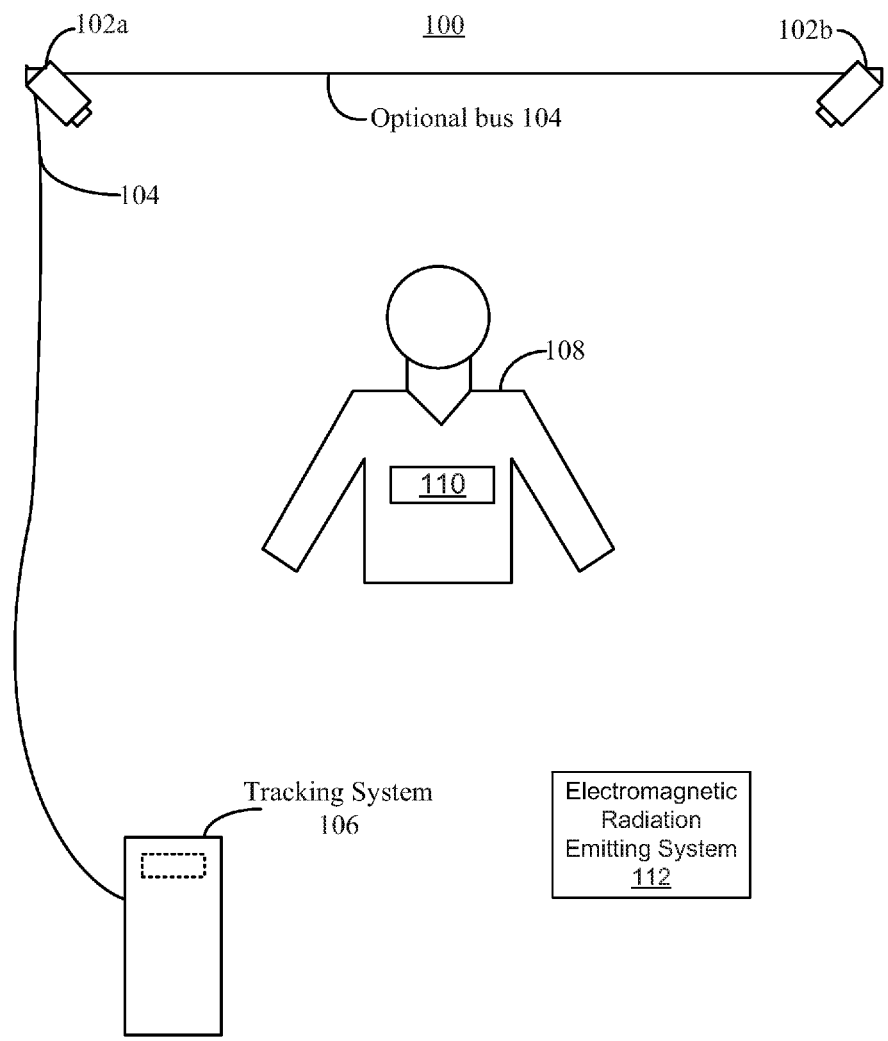
FIG. 1A shows a block diagram of an embodiment of a system 100 for tracking an object.

FIG. 1A shows a block diagram of an embodiment of a system 100 for tracking an object. System 100 may include cameras 102a and 102b, optional bus 104, tracking system 106, object 108, marker 110, and the electromagnetic radiation emitting system 112. In other embodiments, the system 100 may not have all of the elements listed and/or may have other elements in addition to or instead those listed.

Cameras 102a and 102b capture images of the object and may track the object as the object moves. Although only two cameras are shown, there may be any number of cameras in system 100. Any place where cameras 102a and/or 102b are mentioned, any number of cameras may be substituted.

The cameras 102a and 102b may be any devices configured to capture images including, for example, any one of, some of, any combination of, or all of a fixed camera, a moving camera, a high definition camera, an analog camera with digital converter, a panoramic camera, a high resolution camera, an infra-red camera, a pan-tilt-zoom camera, a commercial off the shelf camera, a web-camera, a camera on a mobile electronic device, a satellite camera, and a microwave camera, for example.

In one embodiment, the cameras 102a and 102b may be pan-tilt-zoom cameras that determine their direction of movement based on a specified angle in a specified direction, based on a specified speed in a specified direction, and then quickly provide responses to commands even while moving at a particular speed. Experimentally, it is generally accepted that position and velocity measurements provide smoother, more accurate motions for tracking.

The cameras 102a and 102b may be configured to work in concert with one another, creating complete, seamless fields of view throughout an area.

The cameras 102a and 102b may have different roles. In an anti-terrorist setting, the cameras 102a and 102b may be used to provide digital images of suspicious objects and track the location of those images throughout a sensitive terrorist target area. The cameras 102a and 102b may be used in a hospital to track patients moving from one area to another, to monitor unauthorized access to controlled substances by patients, to monitor activity of an epilepsy patient in order to determine if the epilepsy patient is experiencing an epileptic seizure.

The cameras 102a and 102b may move or may be fixed. Those that move may move from point to point; smoothly and continuously; in a wait, move, stop, and move again pattern; move when an object approaches the limit of a viewing angle; or keep the object at center at all times.

The optional communications bus 104 communicatively couples, cameras 102a, 102b, and the rest of the tracking system. The optional communications bus may communicate with the cameras 102a and 102b by a wired or wireless connection. The wireless connection can be Wi-Fi, Wi-Max, 4G, 3G, or Bluetooth, for example. The wired connection can be USB, firewire, SATA, or HDMI, for example.

Tracking system 106 controls the positioning, focus, and/or zoom of the cameras 102a and 102b, analyzes the data received from cameras 102a and 102b. The tracking system 106 may be a programmed computer and/or a specialized controller. The tracking system is more extensively discussed in FIG. 1C.

Object 108 is the object being tracked which could be any object, which may be a living organism or an inanimate object. As one example, object 108 may be a patient, such as a person with epilepsy. As an example of an inanimate object, object 108 may be jewelry or another object of value. Object 108 is tracked by cameras 102a and 102b under the control of tracking system 106.

Marker 110 may be a piece of material that reflects and/or emits a particular relatively narrow band of light. For example, the band of light may be narrow enough that for engineering purposes, the band of light is considered as a single wavelength. Cameras 102a and 102b detect the wavelength of light transmitted from marker 110, tracking system 106 analyzes the data detected and determines the signals to send to cameras 102a and 102b to track to reposition, refocus, and/or adjust the zoom of the cameras 102a and 102b to track object 108. In an embodiment, cameras 102a and 102b or tracking system 106 may store a log of the position, significant events (e.g., an event that is likely a seizure or other abnormal behavior), and/or the orientation of object 108.

The marker 110 may include, for example, any one of, some of, any combination of, or all of a paint, an ink, an adhesive substance, a spray on substance, a balm, clothing such as shoes or a shirt, a hat, a tag, a card, a patch, a substance injectable into living or nonliving things, and the like. The marker 110 may consist of multiple items in order to make it easier to detect by an object detector of the analysis and control routines 147 (which will be discussed in FIG. 1C). The band of light which the marker 110 may reflect or emit may be detected by the cameras 102a and 102b or by an optional electromagnetic sensor system.

In another embodiment, the marker 110 may emit and/or reflect all bands of Electromagnetic Radiation (EMR), any part of a band of EMR, any combination of bands of electromagnetic radiation, and the like. For example, the marker 110 may be used to emit and/or reflect the EMR band of a particular type of EMR, for instance, by solely detecting the band between 790 terahertz to 400 terahertz, representing only the visual light spectrum. Alternatively, the marker 110 may selectively reflect and/or emit a small section of the x-ray band, such as 20 exahertz to 5 exahertz. Alternatively, the marker 110 may reflect and/or emit the band of radiation represented by segments of a few consecutive bands, various different bands within different spectra, The marker 110 reflects and/or emits a particular band of EMR, which an optional electromagnetic sensor system may detect, and the electromagnetic sensor may transmit data about the ambient electromagnetic radiation to be processed in the analysis and control routines 147 (FIG. 1C).

The marker 110 may be configured to emit a particular band of light or other EMR at specific intervals using a local, generalized, or wireless power source. In order to save power, the marker need not transmit its signal continuously. For instance, the marker 110 could transmit EMR for a hundred milliseconds once every second. The marker may also emit only a particular intensity of EMR depending on the expectation of background EMR in the band that the electromagnetic sensor is configured to detect.

The marker 110 may be configured to both reflect and emit EMR in a particular band. For instance, the marker 110 may detect the level of ambient relevant EMR and determine that there is insufficient EMR to rely on a marker's 110 reflection. This may trigger the marker 110 to use a power source to emit ER. Alternatively, the marker 110 may be configured to consistently reflect and emit either the same or different bands.

The marker 110 may also be specially shaped in order to allow for better detection. For instance, the marker may be shaped like a bar, an "x," or like a crosshair in order to allow more effective execution of the analysis and control routines 147 (FIG. 1C) in order to facilitate location and/or identification. The shape of the marker 110 may also be used to determine the orientation of an object using the analysis and control routines 147. For the purposes of this specification, the marker 110 may be called either "marker" or "tag."

The Electromagnetic Radiation Emission System ("ERES") 112 may include, for example, any one of, some of, any combination of, or all of a transmitter, incandescent substance, a prism, a lamp, a microwave emitter, a radio, any other electromagnetic radiation emitting device, and the like. An ERES 112 may be necessary because the intensity of a particular band of local ambient EMR may be too weak for reliable detection. The ERES 112 may be configured to emit EMR consistently, at different intensities, when triggered by the analysis and control routines 147 (FIG. 1C) or by any other system, periodically, or in response to an alert, for example.

The ERES 112 may emit all bands of EMR, any part of a band of EMR, any combination of bands of electromagnetic radiation, and the like. For example, the ERES 112 may be used to emit the EMR band of a particular type of EMR, for instance, by solely detecting the band between 790 terahertz to 400 terahertz, representing only the visual light spectrum. Alternatively, the ERES 112 may selectively emit a small section of the x-ray band, such as 20 exahertz to 5 exahertz, for example.

The ambient EMR may contain several different elements, and the ERES 112 may be used to emit a particular band of EMR in order to accentuate the reflectivity of the particular band of EMR. The ERES may not be necessary if the reflectivity of the marker can make sufficient use of the ambient electromagnetic radiation or if the marker 110 is itself an emission device.

Figure 1B:
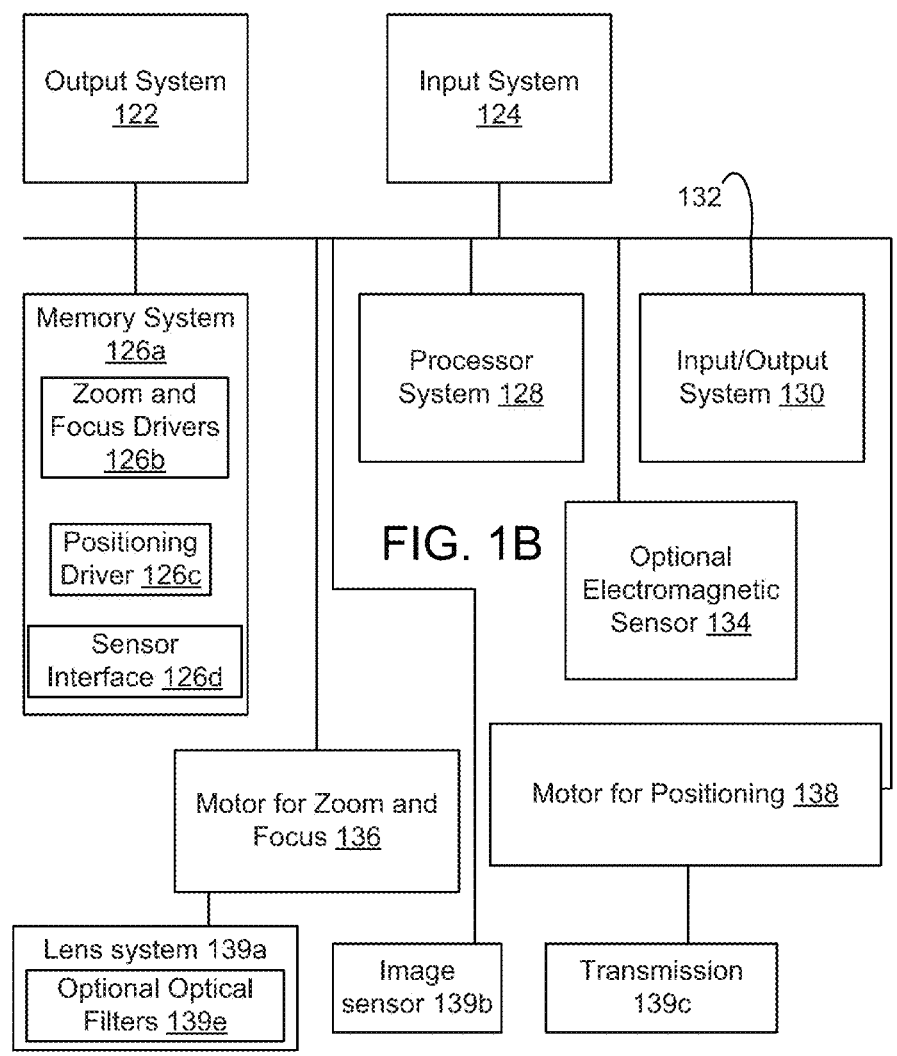
FIG. 1B shows a block diagram of an embodiment of a camera 102a or 102b.
Figure 1C:
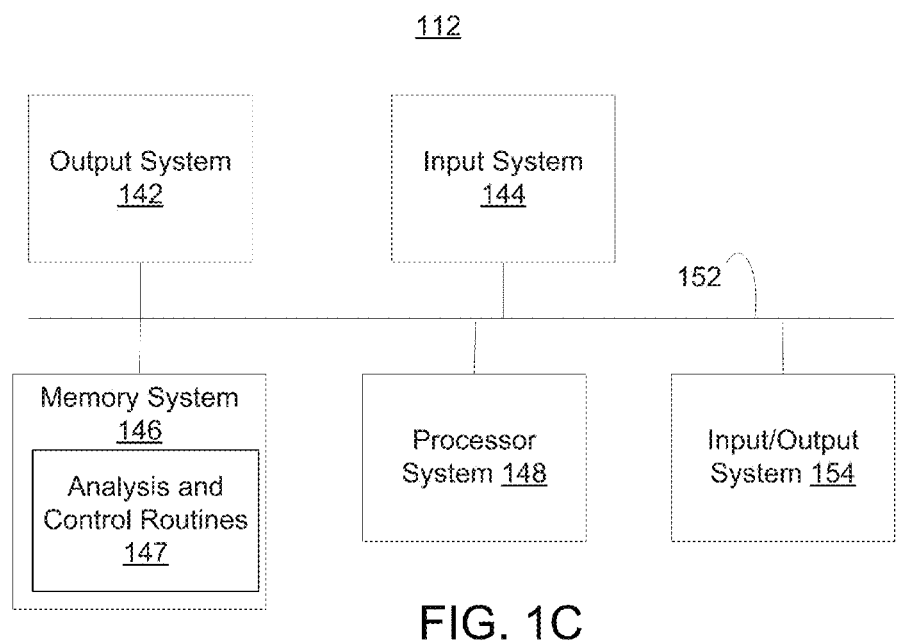
FIG. 1C shows a block diagram of an embodiment of tracking system 106.

FIG. 1B shows a block diagram of an embodiment of a camera 102a or 102b. Camera 102a or 102b may include output system 122, input system 124, memory system 126a having zoom and focus drivers 126b, positioning drivers 126c, and/or sensor interface 126d, camera 102a or 102b may also include processor system 128, input/output 130, optional electromagnetic sensor 134, motors for zoom and focus 136, motor for positioning 138, lens system 139a, image sensor 139b, transmission 139c, and optional optical filter 139e. In other embodiment, the camera 102a or 102b may not have all of the elements listed and/or may have other elements in addition to or instead of those listed.

Cameras 102a or 102b track an object. Output system 122 may include an output information panel including information about the focus, zoom, f-stop, shutter speed, or the amount of time the frame that is exposed, and/or the orientation of the cameras 102a and 102b. Output 122 may also include an interface for sending image data and control information to tracking system 106 (FIG. 1A). Output system 122 may communicate with removable machine readable media in order to store information on the machine readable media. Output system may also be configured to communicate with an optional electromagnetic radiation emission device in order to control output of electromagnetic radiation.

Input system 124 may include a control panel for adjusting the focus, zoom, and/or position of cameras 102a and 102b. Input 124 may include an interface receiving control signals controlling the position, zoom, and focus of cameras 102a and 102b from tracking system 106.

Memory system 126a may store applications containing algorithms that control cameras 102a and 102b and/or data recorded by cameras 102a and 102b. The memory system 126a may also store zoom and focus drivers 126b, positioning drivers 126c, and the sensor interface, for example.

Zoom and focus drivers 126b may include algorithms (machine instructions), which when run by the processor system generate control signals that control the motors, which adjust the positions of the lenses and thereby control the zoom and focus of the lenses.

Positioning drivers 126c may include algorithms (machine instructions), which when run by the processor system generate control signals that control the motors that adjust the position of cameras 102a and a 102b, thereby controlling the direction in which cameras 102a and 102b are pointed. The positioning drivers 126c may instruct the cameras 102a and 102b to move from point to point; smoothly and continuously; in a wait, move, stop, and move again pattern; move when an object approaches the limit of a viewing angle; or keep the object at center at all times.

Sensor interface 126d may be an algorithm for storing and/or interpreting data from an image sensor and/or from a light sensor that senses the narrow band of light transmitted from marker 110.

Processor system 128 runs the algorithms stored in memory 126a, such as zoom and focus drivers 126b, positioning drivers 126c, and sensor interface 126d. Consequently, processor 128 determines the position, focus, and zoom of the camera by sending control signals to the motors that control the transmission and the lens positions. Input/output 130 may perform any of the functions of input 124 and/or output 126.

The optional electromagnetic sensor 134 may detect the narrow band of light transmitted from marker 110. Alternatively, the optional electromagnetic sensor 134 may detect a variety of bands of electromagnetic radiation ("EMR") outside of the visible light spectrum.

The motors for zoom and focus 136 control the positioning of the lenses to thereby control the zoom and focus of the lenses system. The motor for positioning 138 positions cameras 102a and 102b (FIG. 1A). Lens system 139a may be the lenses that focus the incoming light onto an image sensor, such as a charge couple device (CCD). Image sensor 139b senses the light from the lens system 139a and sends the data to memory 126a. Transmission 139c is the gear system connected to motor used to position cameras 102a and 102b. The analysis and control routines 147 (FIG. 1C) may include algorithms to alternate focal lengths when capturing images in order to determine the depth of an object.

The optional optical filter 139e may be used to limit the amount of light from certain spectra that enters a camera. For instance, in one embodiment, the optional optical filter 139e may limit by 50% of the extent to which all visible light, except green light, enters the lens system 139a of the cameras 102a and 102b (FIG. 1A). In doing so, anything green will appear brighter, because the optional optical filter 139e filtered out other colors to some extent.

Colors represent merely the visible light element of the electromagnetic spectrum. In an alternative embodiment, the optional optical filter 139e may filter out other electromagnetic radiation, for instance a part of the infra-redspectrum.

FIG. 1C shows a block diagram of an embodiment of tracking system 106. Tracking system 106 may include output system 142, input system 144, memory system 146, control and analysis algorithms 147, processor system 148, communications bus 152 and input/output system 154. In other embodiments, the tracking system 106 may not have all of the elements listed and/or may have other elements in addition to or instead of those listed.

The output system 142 may include any one of, some of, any combination of, or all of an electromagnetic radiation emitting system, a display system, a printer system, a speaker system, a connection or interface system to a sound system, an interface system to peripheral devices and/or a connection and/or a interface system to a computer system, intranet, and/or internet, and the like. Output system 142 may include a monitor and/or other output device. Output system 142 may include an interface for sending output signals to cameras 102a and 102b or the optional communications bus 104, indicating the position, focus, zoom and aperture for cameras 102a and 102b (FIG. 1A).

The input/output system 154 may be configured to communicate data between the electromagnetic sensor and the hardware system. For instance the input/output system may relay data about the ambient electromagnetic radiation to the hardware system. The input/output 154 system may facilitate communications from the image capture system, the network interface system, the electromagnetic sensor system, and the electromagnetic radiation emission system 112 to the hardware system.

The input system 144 may include any of, some of, any combination of, or all of a keyboard system, an interface to receive image and sensor data from cameras 102 and 102b, a mouse system, a track ball system, a track pad system, buttons on a handheld system, a scanner system, a microphone system, a touchpad system, and/or a connection and/or interface system to a computer system, intranet, and/or internet (e.g., IrDA, USB), and the like. Input system 144 may receive information about the current zoom, focus, aperture, and position of cameras 102a and 102b (FIG. 1A). Input system may also receive all image and sensor data from cameras 102a and 102b as well as the optional electromagnetic sensor 134 (FIG. 1B).

Memory system 146 may store algorithms for analyzing data received from camera 102a and 102b (FIG. 1A) and determining the position and orientation for the object 108 and for determining the position, aperture, focus, and zoom appropriate for tracking object 108 (FIG. 1A). The memory system 146 may include, for example, any one of, some of, any combination of, or all of a long term storage system, such as a hard drive; a short term storage system, such as a random access memory; a removable storage system such as a disk drive, floppy drive or a removable drive; and/or flash memory. The memory system 146 may include one or more machine readable media that may store a variety of different types of information. The term machine-readable media may be used to refer to any medium capable of carrying information that is readable by a machine. One example of a machine-readable medium is a computer-readable medium.

The memory system 106 may be configured to store the applications necessary to provide instructions to the analysis and control routines 147 in order to accomplish the computations mentioned above in the discussion of analysis and control routines 147. The memory system 146 may also store variables, intermediates, results, constants, and the like necessary to execute the analysis and control routines. The memory system 146 may store a log of events representing activity of a marker. The memory system 146 may also be configured to store a database containing image capture data fitting certain criteria, for instance, motion of a patient in a hospital, motion of passengers in an airport, trespassing, removal of an object from a particular place, and the like.

The memory system 146 may include at least one memory device and may store analysis and control routines 147. Analysis and control routines 147 are the algorithms for analyzing data received from camera 102a and 102b and determining the position and orientation for the object 108 and for determining the position, aperture, focus, and zoom appropriate for tracking object 108 (FIG. 1A) Embodiments of the analysis and control routines 147 are explained in greater detail in FIG. 1D.

Processor system 148 runs the algorithms and analysis control routines 147 stored in memory 146. Consequently, processor 148 analyzes data received from camera 102a and 102b for determining the position and orientation of the object 108 and for determining the position, aperture, focus, and zoom appropriate for tracking object 108 (FIG. 1A). The processor system 148 transmits data to adjust the position, focus, aperture, zoom of cameras 102a and 102b. Input/output 154 may perform any of the functions of input 142 and/or output 144.

The processor system 148 may include any one of, some of, any combination of, or all of multiple parallel processors, a single processor, a system of processors having one or more central processors, a logic circuit and/or one or more specialized processors dedicated to specific tasks.

Figure 1D:
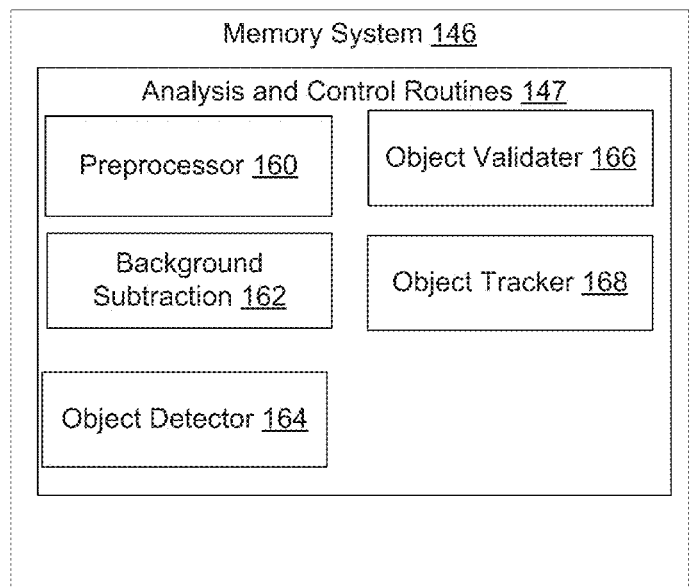
FIG. 1D shows a block diagram of an embodiment of memory 146.

FIG. 1D shows a block diagram of an embodiment of memory 146. Memory 146 may include analysis and control routines 147, which in turn may include preprocessor 160, background subtraction 162, object detector 164, object validate 166, object tracker 168. In other embodiments, the memory 146 may not have all of the elements listed and/or may have other elements in addition to or instead those listed.

Analysis and control routines 147 may be executed by an embodiment of the processor system 148. The preprocessor may preprocess the sensor or video data to make the data suitable for further processing and analysis. The preprocessing involves steps such as noise reduction and contrast enhancement.

Background subtraction 162 may model the background conditions of the scene, thereby accentuating the non-background pixels in the scene at the time of processing. The background model can be static or dynamic and adaptive. Static models are easier to compute, have low computational complexity, but are applicably in those cases where scene conditions do not change with time.

A variety of background modeling algorithms can be used for determining the background, such as a fixed-threshold approach (e.g., if the movement between frames is below a fixed threshold, then the feature in questions is grouped as background), or algorithms like Gaussian mixture modeling, kernel density estimators, mean-shift filtering, and Kalman filtering, for example. The approach taken in the embodiment of FIG. 1D accounts for the feedback from the object tracker to determine which pixels in the scene are currently part of the foreground, and hence suppresses the updating of the background model in those regions.

In each of the Gaussian mixture modeling, kernel density estimator, mean shift filtering, and Kalman filtering a density function is computed that represents the background of the image. Gaussian mixture modeling represents a parametric probability density function as a weighted sum of Gaussian component densities. A Gaussian mixture model is a weighted sum of M component Gaussian densities as given by the equation, $$p(x|\lambda) = \Sigma_{i=1}^{M} w_i g(x|\mu_i, \Sigma_i),$$

where x is a D-dimensional continuous-valued data vector (i.e. measurement or features), are the component Gaussian densities and $w_i$, i=1, . . . , M, are the mixture weights, and $G(x|\mu_i, \Sigma_i)$, i=M are the component Gaussian densities. Each component density is a D-variate Gaussian function of the form, $$g\left(x|\mu_i, \sum_i\right) = \frac{1}{(2\pi)^{D/2}|\Sigma_i|^{1/2}} e^{-\frac{1}{2}(x-\mu_i)\Sigma_i^{-1}(x-\mu_i)}$$

with mean vector $\mu_i$ and covariance matrix $\Sigma_i$. The mixture weights satisfy the constraint that $$\Sigma_{i=1}^{M} w_i = 1.$$

The complete Gaussian mixture model is parameterized by the mean vectors, covariance matrices and mixture weights from all component densities. The mean vectors, covariance matrices and mixture weights parameters are collectively represented by the notation, $$\lambda = \{w_i, \mu_i, \Sigma_i\} \ i=1, \ldots, M.$$

There are several variants on the GMM. The covariance matrices, $\Sigma_i$, can be full rank or constrained to be diagonal. Additionally, parameters can be shared, or tied, among the Gaussian components, such as having a common covariance matrix for all components, the choice of model configuration (number of components, full or diagonal covariance matrices, and parameter tying) is often determined by the amount of data available for estimating the GMM parameters and how the GMM is used in a particular application. It is also important to note that because the component Gaussian are acting together to model the overall feature density, full covariance matrices are not necessary even if the features are not statistically independent. The linear combination of diagonal covariance basis Gaussians is capable of modeling the correlations between feature vector elements.

Kernel density estimation is a non-parametric method, unlike the Gaussian mixture model. Kernel density estimation attempts to estimate the probability density function of an unknown variable. In the following equation, $(x_1, \ldots, x_n)$ may be from a data sample with an undetermined density, f, $K(x)$ may be a symmetric kernel, h may be bandwidth, $K_h(x)$ may be a scaled kernel defined as $K_h(x)=1/h\ K(x/h)$, $$f_h(x) = \frac{1}{n}\sum_{i=1}^{n} K_h(x - x_i) = \frac{1}{nh}\sum_{i=1}^{n} K\left(\frac{x - x_i}{h}\right)$$

A common method for estimating the bandwidth, h is the following function defining the normal distribution approximation, $$h \approx 1.06\sigma n^{-\frac{1}{5}},$$

where σ is the standard deviation of the samples.

Bandwidth may be more precisely estimated using the mean integrated square error. This may be approximated using the following equation:

$$MISE(h) = E\int((f_h(x) - f(x))^2 dx$$

Where $f_h(x)$ is the kernel density estimator dampened by bandwidth h.

Mean shift filtering is a non parametric, mode-seeking algorithm used to locate density function maxima. For the kernel function, $K(x_i-x)$, the weighted mean of the density in the window determined by $K(x)$ may be expressed as:

$$m(x) = \frac{\Sigma x_i \in N(x) K(x_i - x) x_i}{\Sigma x_i \in N(x) K(x_i - x)}$$

Where $N(x)$ is the neighborhood of x, a set of points for which $K(x)$ does not equal zero. The equation is repeated iteratively until $m(x)$ converges with x.

The Kalman filter determines instances in which the K value representing the density function is better represented by a prediction equation using prior measurements than by the current measured value. In doing so, it creates smoother transitions between data and eliminates points that are more likely to be noise. The algorithm may determine whether the measurement error covariance is low, making the actual measured value more trustworthy and hence accepted. The algorithm may alternatively determine that the a priori estimate is low enough that the actual measurement is less trustworthy than the estimated value.

The object detector 164 may take as an input the location of foreground pixels in the image (represented as a two tone image), and analyze them to detect objects in a particular scene. It may begin by delineating contours in the two-tone image, which generally represent the connected components. The resulting contours may be treated as candidate objects and can be further analyzed to filter out irrelevant objects using criteria such as minimum and maximum size and history information such as the presence/absence of tracked objects in the vicinity. In an embodiment in which the camera is fixed, motion-based object detection, such as optical flow or simple frame differencing, may also be used to detect and/or track the location of the object of interest.

The object detector 164 can determine the location of the object by using a variety of methods including a stereo image depth computation, three-dimensional orientation computing, object pose/orientation computation or the like.

One Primary Reference Sensor & Multiple PTZ Cameras (for Multiple TAGS)

In this scenario, there is 1 primary sensor (reference camera) and 2 or 3 or multiple following cameras.

The reference camera/sensor, identifies one or more objects or people. Since each person or object may need to be tracked, then each object or person needs its own PTZ/moving camera assigned to it. Hence the system will assign each moving object/person to each of the moving/PTZ camera to track. For example, a room may have 2 people in it and moving around that may need to be tracked. Each person will have a TAG (which may be the same or different). The primary/reference sensor, detects the 2 tags and identifies the objects and locations to track. Then the system will assign Object #1 to Moving-PTZ-camera #1 to track. Then assign the $2^{nd}$ object/person to $2^{nd}$ camera to track. Then each camera tracks its own object/target. The primary sensor provides the current location information. This can be extended to 3 or 4 or many following cameras.

This is similar to a 1-many relationship for ONE primary-reference sensor to MANY following secondary PTZ cameras.

If the TAG is SAME, then the assignment may be random and the mixing of people may be possible sometime. To avoid mixing people, system will use the location, direction, speed, size, brightness, intensity, histogram and other imaging parameters to decide and differentiate and identify the right target or object. Then follow it.

If the TAGS are DIFFERENT, meaning the tag size, shape, intensity, are different, then the TAG itself can be used to distinguish and identify the right person and not mix the person ID. With different TAGs, correct ID for a person can be maintained. Hence the camera will follow the right person Multiple PTZ following cameras can be used in both of the following cases:

Case 1: 2 or more people and each camera is following one person

Case 2: 1 Person that moves between different areas or zones. Camera 1 tracks zone/area 1; and camera #2 tracks Zone/area 2.

Panorama/360/Wide-Angle Camera with HD or Higher Resolution

There are new types of cameras that see full 360 or 270 or wide angle views. They can also be HD (highDEF) or high resolution or mega-pixel cameras. Typically they have 1920× 1080 or mega pixels can be 4000×3000 or different high resolutions. Some have 5M or 8M or 10M pixels. (8M pixels will have 8 million pixels). With these, these PTZ cameras can be replaced. These fixed Panorama or HD/HighRes cameras will be used. Then the object location and position is identified from the primary or reference camera. Then the object location and video is "cut out" or extracted or a "sub-window" is extracted from this large mega pixel camera. Then this video is streamed out from the moving sliding window. For example, the output may be SD (640×480). The object location can be identified and a window of 640×480 (or a similar window) can be used to place and extract the video images from the camera. As the target moves, the window location and size is changed/repositioned. This video of lower resolution is output, similar to the PTZ camera. This is a new innovative alternative to PTZ cameras, where a fixed megapixel camera acts like a digital or electronic PTZ in which the moving window is included with an output video.

With this, a 1 mega pixel camera can act as (or accommodate several smaller windows or PTZ cameras, say 4 or 6). A real time video output is made from each of these smaller windows (as though they are a PTZ moving camera), but actually the video is extracted and sent from a fixed HD/high resolution camera.

This can be cost effective in some areas and reduce the number of cameras.

When using a panorama and 360/270 deg cameras, the image is warped and the images need to be de-warped and made planner and flat so that the images are viewable. De-warping is part of this step before the normal video is output A principle that may be used to obtain a stereo image is triangulation. The three-dimensional location of a world-point projected onto image planes can be computed by finding the intersection of the two lines passing through the center of the image and the projection of the point in each image. In order to find the intersection of the lines passing through the projections, first a correspondence problem needs to be solved that determines the correspondence of the point in the image to the objects detected. Solving the correspondence problems can be accomplished by a variety of methods, such as minimizing the matching error based on some local measurement (color, intensity, texture etc.), multi-scale edge matching, dynamic programming, relaxation labeling, graph cutting, and/or other techniques for determining the correspondence.

Once the correspondence problem has been solved, a three-dimensional reconstruction can be made by utilizing the following equation:

$$Z=(B*f)/d$$

Here, 'B' represents the distance between the centers of projection, known as the baseline, 'f' represents the camera focal length, and 'd' represents the distance between the corresponding points when the two images are superimposed, known as the disparity, d, which can be expressed as d=(x1−x2).

In an embodiment, B may be the distance between cameras. The point P may appear in different locations in the two Stereo image capture devices. For example, Point P will appear at a location X1 in a first image capture device and a location X2 in a second sensor or image capture device. Using these locations X1 and X2, the disparity distance is computed, which is also called off-set or disparity distance. From the disparity distance, the mathematical triangulation can be computed and object or point depth Z can be obtained.

It should be noted that the above formulations have been provided for an aligned stereo rig. For unconstrained stereo rigs, a prior step of rectification may be required. In this case, known sensor or camera calibrations, although not required, simplify the rectification process. Further, rectification is also strictly not required, but it makes solving the correspondence problem much less computationally expensive.

For general stereo problems, more than 2 perspectives can be utilized for more robust correspondence estimation and for resolving ambiguities. For example, in a three image capture system, the correspondence can be estimated between the first and second image capture devices, the 3D point reconstructed, and then projected again into the third image capture device. If a matching point can be found near the projection point on the third image capture device, then the correspondence solution may be accepted or rejected.

The accuracy of three-dimensional reconstruction may be heavily dependent upon the accuracy of point correspondence. As mentioned above, approaches exist for estimating good correspondence, and these can be further improved by employing more than 2 views. However, the downside of such approaches is heavy computational cost, expensive hardware and in most cases the processing is not performed in real-time.

In an embodiment of the current method of tracking and locating objects the correspondence problem can be solved, without requiring computationally intensive algorithms, expensive hardware or more than two cameras (and therefore can be solved in real time). In an embodiment, the object-of-interest is uniquely defined and can be easily separated from other elements of the scene based on visual appearance. Tracking and locating the object without intensive computing is possible by employing reflective light technology such that the spectral signature (intensity, or any color band, or any particular range of the EM spectrum) received for the object-of-interest is unique and can be easily differentiated from the background. Any range of the EM spectrum waves can be used by the source and sensor. For example, the range of the EM spectrum that may be used by the source and sensor may be visible, IR, UV, X-ray and thermal wavelength sources and corresponding sensors to observe that wavelength. Further, for accurate localization of the feature point used for correspondence, the shape of the object may be designed such that the shape offers uniquely distinguishable feature points. For example, the object-of-interest may be cross-shaped and the intersection point of the arms of the cross can be easily detected and used as a feature point for the correspondence problem. Similarly, other shapes and configurations are possible.

Regarding the problem of computing the object's orientation with respect to the camera, the problem can be formally stated as: given a set of points defined in the object-centered frame, and their projections onto the image plane, determine the transformation between the object-centered and image-centered frame. The transformation here includes rotation (R) and translation (t) components.

Various methods have been proposed in the literature for solving the translation problem. Assuming that the object model is known (that is, the geometric configuration of the features on the object is known), the methods may be categorized into at least 2 categories. If the number of point correspondences is limited, a closed-form solution may be used. Closed form solutions may be used when there are 3 points, 3 lines, 4 coplanar points, and/or 4 general points, for example. When the number of point correspondences is greater than 6, iterative numerical solutions may be used to determine orientation. The iterative methods although more robust, suffer from the drawback that if an approximate initial pose is not known well enough, the number of iterations may be numerous and/or the problem may be unsolvable. In the following, we briefly describe a method (called POSIT) that is iterative but does not require an initial pose. The equations relating the perspective projections are:

$$P_0 P_i \cdot \frac{f}{Z_0} i = x_i(1+\varepsilon_i) - x_0$$

$$P_0 P_i \cdot \frac{f}{Z_0} j = y_i(1+\varepsilon_i) - y_0$$

$$\varepsilon_i = \frac{1}{Z_0} P_0 P_i \cdot k$$

Here $P_0$ is a reference point on the object (relative to which the object geometry is defined), $P_i$ is any arbitrary feature point on the object, f is the focal length of the camera, $Z_0$ is the distance of $P_0$ from camera along the z-axis, $(x_0, y_0)$ are the coordinates of the image of the point $P_0$ on the image plane, $(x_i, y_i)$ are the coordinates of the image of the point $P_i$ on the image plane, and i, j, k are the row vectors of the rotation matrix R given by $$R_{3\times 3} = \begin{pmatrix} i \\ j \\ k \end{pmatrix}.$$

Note that only two rows of the rotation matrix are independent. For example, k=i×j. It may be desired to find i and j which will give the complete pose of the object. In the POSIT algorithm, the above set of non-linear equations is solved linearly and iteratively by assigning a fixed value to $\epsilon_i$, starting with $\epsilon_i$=0, and then iteratively correcting it using the value of $\epsilon_i$ computed by solving the equations in the previous iteration step. In an embodiment, a feature of the technique of solving for orientation is that the above set of equations are solved linearly and directly (without any iterating, the depth computation is performed to solve for Z), the above set of equations become linear with six unknowns, and hence locating a three feature points correspondence is sufficient to solve for the object pose accurately. Some advantages of embodiment in which the POSIT equations are solved using Z for the depth computation are, there are fewer feature point correspondences required; the computation is more efficient because no iterations are required; and the equations yield a more accurate solution because the equations are solved in a closed form.

As an option, a secondary Pan Tilt Zoom (PTZ) or moving image capture device can be used to zoom in and track closely the primary objects. A PTZ camera is a closed-circuit television image capture device with remote directional and zoom control. Any camera with a remote pan, tilt, and zoom control may be substituted.

An engine may be used to accomplish one of, both of, or at least two things: the engine maps the (X, Y) location of the object being tracked into a (P, T, Z) value. The mapping may done with a calibration map. The calibration map is scene-dependent but is a one-time configuration step. Then the PTZ camera may be moved so that the error between the desired (or measured) PTZ values and the current (or theoretically computed) PTZ values may be driven to zero as instructions are given to the camera to move using speed instructions. The camera may be moved using speed instructions as opposed to position instructions because moving using speed instructions results in a smoother movement of the PTZ camera. Proportional, Integral, and Derivative (P I D) control may be used to accomplish to zero the difference between the desired PTZ settings and the current PTZ settings.

The object detector 164 may use the above methods to locate or identify living beings or non-living objects such as boxes, vehicles, or parcels in production or shipping, and/or other objects. The tags may identify the location and orientation of these objects or boxes or any things in space.

The object validator 166 may be used to select objects that meet particular appearance criteria and filter out the rest of the image. A distinguishing feature could be a specific shape, color, intensity pattern or any combination thereof, which provides a visual cue for detecting the object. In an embodiment, a combination of specific shape and intensity patterns are used. The object validator 166 may also record the history of each tracked object, and maintain information, such as how the features of the object have evolved over time. Tracking the history of each object is especially useful in suppressing occasional false objects that otherwise seem to meet the visual appearance criteria for objects of interest.

The object tracker 168 may be responsible for tracking the detected objects temporally across frames. There are various methods for object tracking that are used in different embodiments. Different types of feature representations could be used such as color, intensity, texture, Scale Invariant Feature Transform (SIFT) features, silhouette, and/or other feature representations. Once the features have been computed, a correspondence may be established between these features temporally across adjacent frames. This can be done using deterministic or probabilistic methods. For example, optical flow algorithms can be used to track feature points based on intensity. Also, motion constraints such as proximity, small velocity changes, rigidity, etc. can be imposed. Template based methods such as mean-shift tracker can also be used.

The object tracker 168 may also cause a pan/tilt/zoom camera to follow a patient to get three coordinates of location data or each of the pan tilt and zoom measurements. The object tracker 168 may instruct the camera to follow an object to determine its current position. This may be useful to track whether a living being or object remains in a location it is supposed to be or strays into a location where the living being or object should not be.

Alternatively, the object tracker 168 may also execute instructions stored in an application on the memory system to track unusual movement of a being for medical reasons. For instance, the tracker may detect a strange motion of a person that gives the appearance the person is having an emergency medical event, like a heart attack. The tracker may detect that a person is bending over in an area where people are unlikely to be bending over in order to notify an official that the person is more likely to cause a disturbance somewhere, for instance in an airport. The tracker may also track object motion for strange movements, not only to determine if the object is safe, but to determine local seismic activity.

The object tracker 168 may follow instructions of an application stored on the memory that includes detection software in order to track objects moving from one image capture device's view to another image capture device's field of view. Object tracker 168 may accomplish this by detecting where the object leaves the frame of one image capture device and where the object may return or enter the frame of another image capture device. This may be accomplished by the system determining the area where the object left, and try to reacquiring or recapturing the object.

Alternatively, the object tracker 168 may instruct a camera to await the reentry of the object that left the view of a particular image capture device in order to detect the object. If for any reason, the object disappears, the system may wait for the object to reappear.

The object tracker 168 may be able to signal to a particular detection and location image capture device to signal another detection and location image capture device to track a particular object. Alternatively, the analysis and control routines 147 may be able to signal the exchange of an object from the field of view of one tracking camera to the field of view of another tracking camera. The cameras themselves may trigger one another to follow an object as well. Location and identification cameras may be able to trigger the tracking cameras, other location and identification cameras, or other cameras. The triggered cameras could also trigger those cameras.

The object tracker 168 may be able to use data from a number of different image capture devices. For instance, the system may include a fixed camera with a large viewing angle and a pan-tilt-zoom camera with a smaller angle. Using both cameras simultaneously could allow a user a large view overall using the fixed camera while the pan tilt zoom camera could focus on a specific area. The fixed camera could be used to detect and locate objects. The pan-tilt-zoom camera could be used to track the movement of the objects. Tracking cameras can be used to zoom in and closely follow objects. In another embodiment, this two-camera system could use two fixed cameras. The primary camera could still be used to detect and locate objects. The second camera, instead of physically moving in order to zoom, the camera itself could yield a portion of the image that correlates with the object detected. The camera can output video data, which represent an image of a closer, focused view of the object. As such, it would have the effect of providing a pan-tilt-zoom image. This would allow it to track in much the same manner as a pan-tilt-zoom camera. For instance, the secondary camera could have a native resolution of 1920×1080. The video output could focus on a 640×480 video within the camera's native resolution, allowing the output to be better focused on the object.

The object tracker 168 may be able to calculate the position and velocity of a person. The position and velocity data can be used to try to predict the path of a detected object and to determine its likely destinations. For instance, a person moving at six meters per second is unlikely to stop and turn at a doorway five inches in front of him, but he may still likely enter a doorway fifteen feet away.

FIG. 2 shows a flowchart of an embodiment of a method 200 of monitoring objects, implemented by control and analysis routines 147, in which electromagnetic radiation can be used to help detect and locate objects. In this embodiment, the sensor system may detect a particular band of electromagnetic radiation and use the particular band of radiation to locate a marker on an object. In step 202, an electromagnetic sensor system may detect electromagnetic radiation using at least one electromagnetic sensor. The electromagnetic sensor system may be used to detect all bands of electromagnetic radiation ("EMR"), any part of a band of EMR, or any combination of bands of electromagnetic radiation, for example. EMR can be of many different types depending on its frequency. In an embodiment, the electromagnetic sensor senses a narrow band of radiation.

The electromagnetic sensor system may be used to detect the EMR band of a particular type of EMR, for instance, by solely detecting the band between 790 terahertz to 400 terahertz, representing only the visual light spectrum. Alternatively the bandwidth may only be 10 terahertz. Alternatively, the electromagnetic sensor system may selectively detect a small section of the x-ray band, such as 20 exahertz to 5 exahertz. Alternatively, the electromagnetic sensor system may detect the band of radiation represented by segments of a few consecutive bands, such as 200 terahertz to 200 gigahertz, representing consecutive bands of infrared and microwave EMR. Alternatively, the electromagnetic sensor system may detect various different bands within different spectra, for instance, 10 exahertz to 50 petahertz and 350 gigahertz to 350 megahertz, the first band ranging from x-rays to soft x-rays, and the second band ranging from infrared to microwave EMR. The electromagnetic sensor system may transmit data about the ambient electromagnetic radiation to the tracking system 106 to be executed using instructions stored in the memory system by the processor system.

In step 204, an embodiment of the electromagnetic sensor transmits the data about the ambient electromagnetic radiation, including at least the particular frequency band from the marker on the object, to a tracking system 106 (FIG. 1A).

In step 206, an embodiment of the processor system may be configured to execute analysis and control routines 147 stored on the memory device to determine whether any electromagnetic radiation detected includes at least a particular frequency band. If the electromagnetic sensor transmits information about the particular frequency band, the processor will use the data to find data that represents the marker at step 208, and/or determine by processor system the location of an object based on the data representing the marker at step 210. If the electromagnetic sensor does not detect the particular frequency band, the electromagnetic sensor may continue to detect electromagnetic radiation using an electromagnetic sensor at step 202.

In step 208, the processor system determines data representing the marker within the data about the ambient electromagnetic radiation. By using the sensor data from at least one sensor, the processor can determine what part of the data contains the marker. In doing so, the two-dimensional, or three dimensional coordinate of the marker can be superimposed on another set of image data to correlate the data to visual images. A computer can track the location of a marker and if the marker is not visible, visually display where the marker is located. The marker may be visible, invisible concealed for example, and therefore, the marker may appear more pronounced when the data from the electromagnetic sensor is emphasized in the superimposed image. Alternatively or additionally, instead of superimposing images, the marker can be accentuated by limiting the electromagnetic radiation of bands not reflected or emitted by the marker.

Detection software may have modules including any or all of a preprocessor module, a background subtraction module, an object detector module, an object tracker module or an object validation module.

The preprocessor module may preprocess the video data to make the data suitable for further processing and analysis. The preprocessing involves steps such as noise reduction and contrast enhancement.

The Background subtraction module may model the background conditions of the scene, thereby accentuating the non-background pixels in the scene at the time of processing. The background model can be static or dynamic and adaptive. Static models are easier to compute, have low computational complexity, but are applicable only in those cases where scene conditions do not change with time. This assumption can be restrictive.

A variety of background modeling algorithms can be used for determining the background, such as a fixed-threshold approach, Gaussian mixture modeling, kernel density estimators, mean-shift filtering, Kalman filtering, etc. The approach taken in this embodiment accounts for the feedback from the Object Tracker module to determine which pixels in the scene are currently part of the foreground, and hence suppresses the updating of the background model in the background regions.

In step 210, the processor system determines a location of an object based on the data representing the marker. The detection software modules outlined above could have already refined this data. The location of the object may be determined using a variety of methods including a stereo image depth computation, three-dimensional orientation computing, or object pose/orientation computation, for example.

In method 200, each of the steps is a distinct step. In another embodiment, although depicted as distinct steps in FIG. 2, step 202-210 may not be distinct steps. In other embodiments, the method to monitor may not have all of the above steps and/or may have other steps in addition to or instead of those listed above. The steps of the method to monitor may be performed in another order. Subsets of the steps listed above as part of the method to monitor may be used to form their own method.

Figure 3:
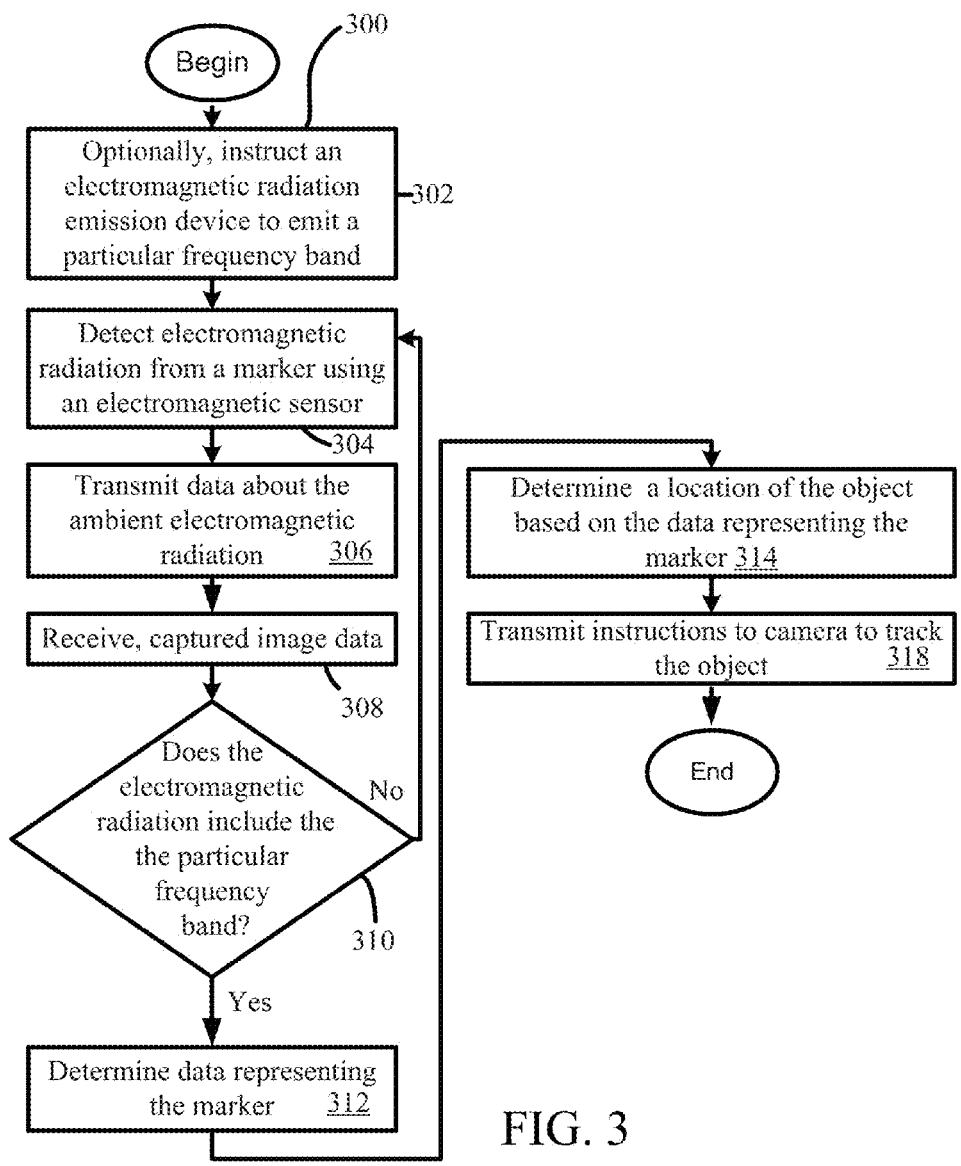
FIG. 3 illustrates a flowchart of another embodiment of a method of monitoring an object implemented by control and analysis routines, in which electromagnetic radiation can be used to help detect and locate objects.

FIG. 3 illustrates a flowchart of another embodiment of a method 300 of monitoring an object implemented by control and analysis routines 147, in which electromagnetic radiation can be used to help detect and locate objects. In the embodiment of FIG. 3, the sensor system may detect a particular band of electromagnetic radiation and use it to locate a marker on an object.

In optional step 302, the tracking system 106 instructs an electromagnetic radiation emission device to emit electromagnetic radiation ("EMR") including at least a particular frequency band. By adding a higher intensity of a particular band of electromagnetic radiation, the marker may simply reflect the particular frequency band that may be detected to locate the object. Of course, in some environments with some spectra, there may be little need for an active transmitter marker or an electromagnetic radiation emitter. The reflection may very well be strong enough without the emission device or a filter may be used to at least partially filter out other wavelengths not reflected by the marker, and step 302 may be unnecessary.

In step 304, an electromagnetic sensor system may detect a particular band of EMR using at least one electromagnetic sensor, such as a camera and/or a camera combined with one or more other sensor. The electromagnetic sensor system may detect electromagnetic radiation that reflected off of the marker. The electromagnetic sensor may generate a data stream with data representing the measurement of ambient radiation. Detecting the electromagnetic radiation may be performed with a camera and optionally with an array of sensors.

The electromagnetic sensor system may be used to detect any part of a band of EMR, any combination of bands of electromagnetic radiation, for example. The EMR transmitted for the marker may be of many different frequencies. In an embodiment, the electromagnetic sensor senses a narrow band of radiation.

The electromagnetic sensor system may be used to detect the EMR band of a particular type of EMR, for instance, by solely detecting the band that is 1, 5, 10 (for example), or 15 terahertz wide between 400 terahertz to 790 terahertz, representing a narrow band of visual light spectrum. Alternatively, the electromagnetic sensor system may selectively detect a narrow band of the x-ray band, such as 20 exahertz to 5 exahertz. Alternatively, the electromagnetic sensor system may detect a narrow band of radiation between 200 terahertz and 200 gigahertz. Alternatively, the electromagnetic sensor system may detect various different bands within different spectra, for instance. The electromagnetic sensor system may transmit data about the ambient electromagnetic radiation to the tracking system 106 to be analyzed using instructions stored in the memory system by the processor system.

In step 306, an embodiment of the electromagnetic sensor transmits the data about the ambient electromagnetic radiation, including the at least a particular frequency band from the marker on the object, to a tracking system 106 (FIG. 1A).

In step 308, the tracking system 106 receives and analyzes the captured image data transmitted by a captured image device.

In step 310, an embodiment of the processor system may implement instructions from the analysis and control routines 147 in order to determine whether any electromagnetic radiation detected includes the particular frequency band. The processor analyzes the data collected from the electromagnetic sensor to find data that represents the marker at step 310 and/or determine by the processor system the location of an object based on the data representing the marker at step 312. If the electromagnetic sensor does not detect the particular frequency band, the electromagnetic sensor may continue to detect electromagnetic radiation using an electromagnetic sensor at step 302.

In step 312, the processor system determines data representing the marker within the data about the ambient electromagnetic radiation. By using the sensor data from at least one sensor, the processor can determine what part of the data contains the marker. In doing so, the two-dimensional, or three-dimensional coordinates of the marker can be determined. Tracking system 106 may track the location of a marker and visually display where the marker is located.

In step 314, the processor system determines a location of an object based on the data representing the marker. The preprocessor 160, as described in FIG. 1D, may have already refined the data representing the marker. The location of the object may be determined using a variety of methods including a stereo image depth computation, three-dimensional orientation computing, object pose/orientation computation, for example.

In step 318, the tracking system 106 analyzes a direction of motion of the object based on comparing multiple image frames and transmits instructions to the image capture system to track the object by following the marker. The camera (e.g., a pan tilt zoom camera) may be configured to track the object either by moving the image capture device, or by following the marker, digitally.

The tracking system 106 (FIG. 1A) may track objects moving from one image capture device's view to another image capture device's view. Tracking system 106 may detect where the object leaves the frame of one image capture device and where the object may return or enter the frame of another image capture device. Tracking the motion of an object between frames may include determining the area where the object left the frame, determining a trajectory of motion of the abject while leaving the frame, and detecting where the object reappears. Optionally, the tracking system 106 may implement instructions that cause tracking system 106 to send signals that cause an image capture device to await the reentry of the object that left the view of a particular image capture device in order to detect the object. If for any reason, the object disappears, the system may wait for the object to reappear.

The tracking system 106 (FIG. 1A) may command that a particular detection and location image capture device signal another detection and location image capture device to track a particular object. In an embodiment, the processor system may be able to signal the exchange of an object from the field of view of one tracking camera to the field of view of another tracking camera. The cameras themselves may trigger one another to follow an object as well. Location and identification cameras may be able to trigger tracking cameras, other location and identification cameras, or other cameras. The triggered cameras could also trigger those cameras.

Optionally the tracking system 106 may receive instructions from a portable electronic device. For instance, the portable electronic device may be a cellular phone. The portable electronic device's processor system may be configured to execute instructions from an application stored on the portable electronic device memory system to perform any, all or none of the following functions: 1. Receive data from a server. 2. Receive data from the tracking system 106, via the network interface system. 3. Display data received on a display. 4. Transmit instructions to the tracking system 106, transmits instructions to the server, and the like, for example.

Optionally, the tracking system 106 may transmit the data to a server. The data can be any, all or none of data about the ambient electromagnetic radiation including the at least a particular frequency band, captured image data, data representing the marker within the data about the ambient electromagnetic radiation, data representing an image in which the sensor readings are visually superimposed on captured images, data for tracking the movement of an object, for example.

In the embodiments of FIG. 3, each of the steps is a distinct step. In another embodiment, although depicted as distinct steps in FIG. 3, steps 302-322 may not be distinct steps. In other embodiments, the method to monitor may not have all of the above steps and/or may have other steps in addition to or instead of those listed above. The steps of the method to monitor may be performed in another order. Subsets of the steps listed above as part of the method to monitor may be used to form their own method.

Figure 4A:
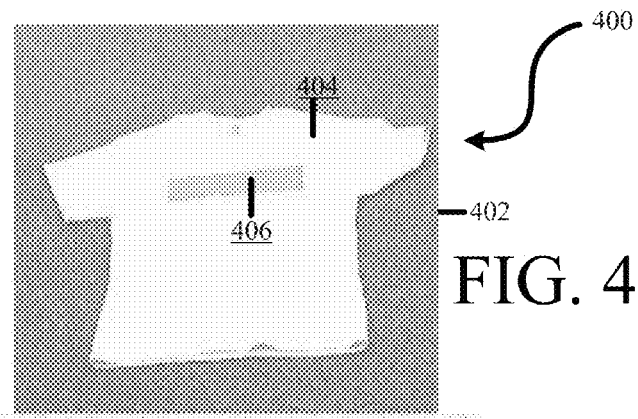
FIGS. 4A-4C Illustrate perspective views of embodiments of the marker.
Figure 4B:
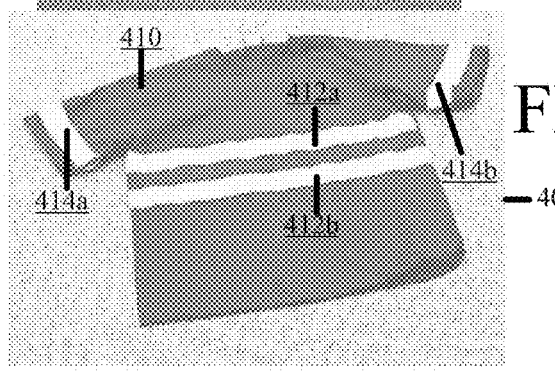
Figure 4C:
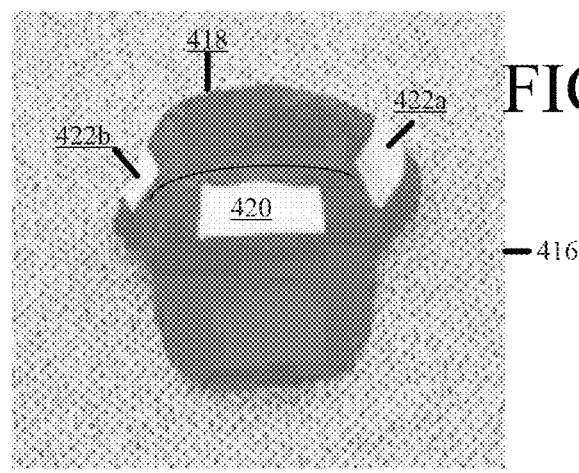

FIGS. 4A-4C illustrate perspective views of embodiments of the marker. In FIG. 4A there is first image 402, there is a shirt 404 with a marker 406. The marker 406 may be configured to reflect electromagnetic radiation ("EMR"). The marker 406 may be of a material configured to reflect or emit a particular band of EMR, detected by an electromagnetic sensor, such as a camera. Marker 406 is placed on the shirt of a person that the tracking system 106 may track. Marker 406 is placed in the chest area of the shirt, but may be placed anywhere on the shirt, such as the back and/or collar. In one particular embodiment, the shape of the marker 406 could be a rectangle. In other embodiments, the marker 406 may include a triangle, square, hexagon, octagon, other polygon, circle, oval, and/or other shape, for example.

In FIG. 4B, image 408 shows another embodiment of the marker 406, which could be a shirt with a variety of EMR reflectors or emitters. The embodiment of FIG. 4B multiple markers are placed on a shirt. The markers may include a first horizontal chest stripe 412a, a second horizontal chest stripe 412b, which may be parallel to the first horizontal chest stripe 412a, a first horizontal arm stripe 414a, and a second horizontal arm stripe 414b, for example. Any design for the reflective or emissive material may suffice.

In FIG. 4C, image 416 shows another embodiment of the marker 406 in which marker 406 is placed on a hat 418. The hat 418 may be any hat including a baseball cap, a helmet, a top hat, or any other cap, for example. Material configured to emit or reflect EMR can be placed about the hat 418. There may be a front stripe 420, a first side stripe 422a, a second side stripe 422b, and/or a back stripe (not shown), for example. In other embodiments, the stripes may be in other locations, such as the brim, the top, and/or the corners of the hat, in addition to and/or instead of the locations shown in FIG. 4C.

Figure 5:
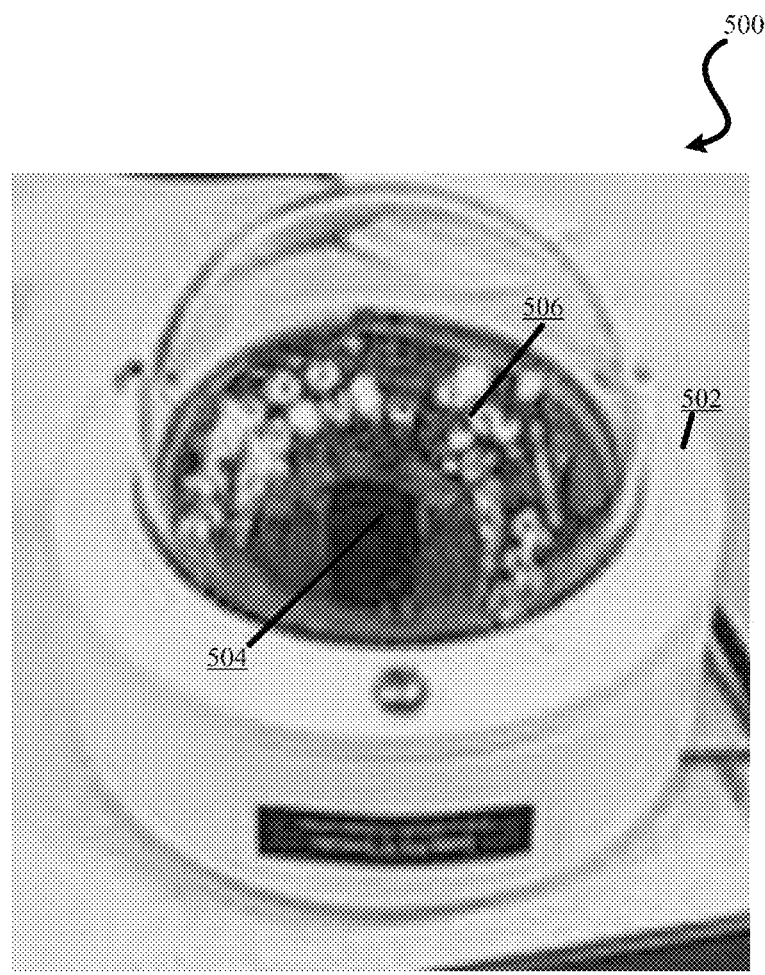
FIG. 5 Illustrates a perspective view of an embodiment of an electromagnetic sensor system.

FIG. 5 illustrates a perspective view of an embodiment of an electromagnetic sensor system. In FIG. 5, the electromagnetic sensor system 502 may include at least one sensor device 506 and at least one image capture device 504 (e.g., a camera).

The at least one image capture device 504 may be any device configured to capture images. In this specification, the terms image capture device and camera are used interchangeably. The terms image capture device and camera may be substituted with one another to obtain a different embodiment. The at least one image capture device 504 may be used to capture images in order to locate and identify objects.

The at least one sensor device 506 may include any number of sensors configured to detect any, all, none, or some bands of electromagnetic radiation ("EMR"). These sensors may be arranged in such a manner as to work in concert to detect and locate objects using a marker configured to emit or reflect a particular band of EMR. The at least one sensor device may detect the intensity of certain bands of EMR.

A processor system of tracking system 106 may be configured to implement instructions found in applications stored in a memory system within the tracking system 106. The location of the object may be determined using a variety of methods including a stereo image depth computation, three-dimensional orientation computing, object pose/orientation computation, for example. The tracking system 106 may also impose a visual representation of the electromagnetic radiation on an image represented by the image capture data. The output may be image data representing where a marker is located by showing, in a captured image, locations from where a particular band of radiation is reflected or emitted.

Figure 6A:
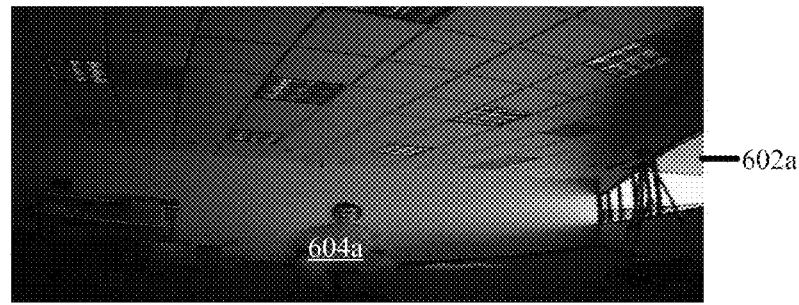
FIGS. 6A-6C illustrate a perspective view of an embodiment of a system for monitoring activity.
Figure 6B:
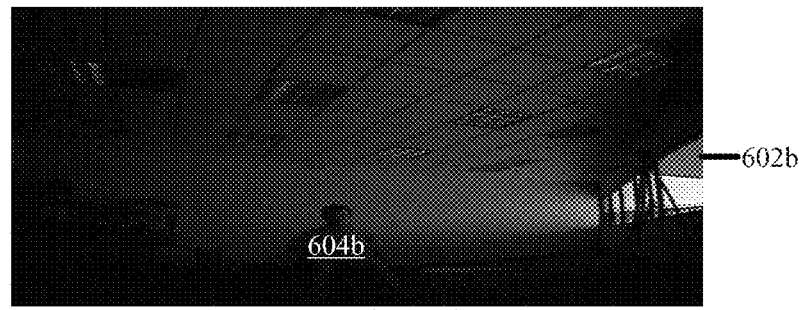
Figure 6C:
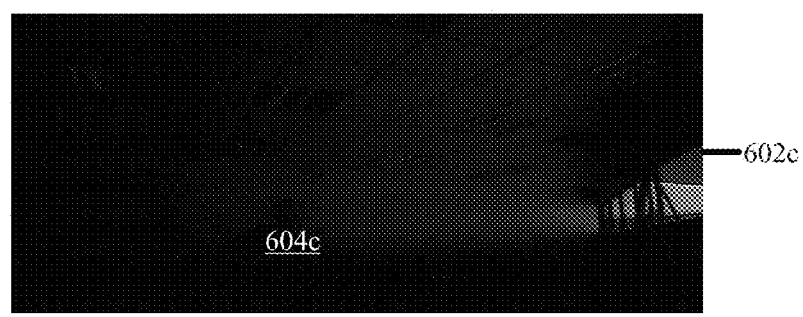

FIGS. 6A-6C illustrate a perspective view of an embodiment of a system for monitoring activity. Images 602a, 602b, and 602c may show a similarly positioned image at different aperture and/or filter settings of an image capture device. An image capture device may apply a band pass filter that partially filters out all wavelengths of light except for a narrow band that characterizes the light emitted by the marker. Alternatively, the aperture may be partially closed, partially blocking all frequencies of light enhancing the contrast between the marker and the rest of the image. An aperture stop may be any kind of stop including a diaphragm which expands and contracts to change the extent to which light is allowed to enter the image capture device. The shutter speed of an image capture device can also affect the intensity of the light presented in the resulting image. In FIGS. 6A-6C, the object has no marker. FIGS. 6A-6C are shown to contrast with the ease of identifying the maker in FIGS. 7A-7C, in which the object has the marker.

In FIG. 6A, the first picture 602a presents an image containing an object captured by a camera with a shutter speed or frame exposure time of 1/2000 of a second. The first object 604a may be seen and detected relatively easily in the first picture 602a.

In FIG. 6B, the second picture 602b presents an image containing an object captured by a camera with a shutter speed or frame exposure time of 1/4000 of a second. The second object 604b may still be seen, but the brightness of the object may appear to fade relative to the background.

In FIG. 6C, the third picture 602c presents an image containing an object captured by a camera with shutter speed or frame exposure time of 1/10000 of a second. The third object 604c may be difficult to see at this aperture setting, and the third object 604c may be less distinguishable from its background.

Figure 7A:
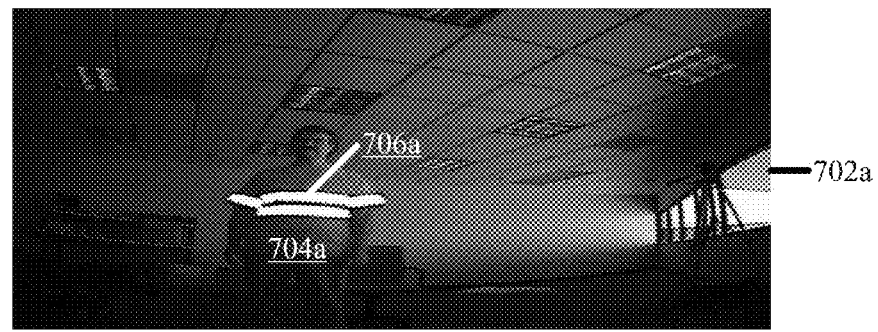
FIGS. 7A-7C illustrate a perspective view of an embodiment of a system for monitoring.
Figure 7B:
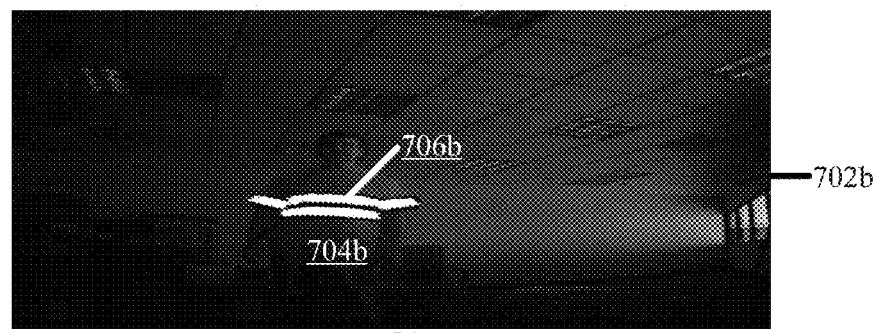
Figure 7C:
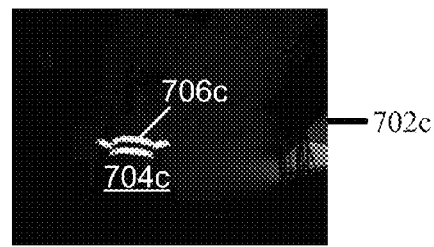

FIGS. 7A-7C illustrate a perspective view of an embodiment of a system for monitoring. A marker can appear more pronounced when image data from an image capture device displays lower light intensity. Adjusting the aperture size (e.g., by changing the f-stop) or by changing the shutter speed, or the amount of time the frame is exposed, may control the light intensity. The aperture stop may be a diaphragm capable of adjusting the aperture size, for example. Shutter speed adjustment may also be used to reduce the intensity of light exposure a particular image receives in addition to or instead of closing the aperture.

In FIG. 7A, picture 702a presents an image with a first object 704a that has a first marker 706a on it, taken with a shutter speed or frame exposure time of 1/2000 of a second. The marker first 706a may be the stripes on a striped shirt worn by the first object 704a. The first marker 706a may reflect or emit electromagnetic radiation (EMR) such that an electromagnetic sensor may detect the particular band or bands of EMR the first marker 706a reflects. By closing the aperture (or increasing the shutter speed), the contrast of the marker relative to the rest of the image is enhanced. The shutter speed or frame exposure time setting of 1/2000 of a second darkens the background, so the highlighted first marker 706a may appear better illuminated when compared with its background.

In FIG. 7B, picture 702b presents an image with a second object 704b that has a second marker 706b on it with a shutter speed or frame exposure time of 1/4000 of a second. The second object 704b may be more difficult to distinguish from the background, as the light intensity of the background is diminished. As such, the second marker 706b may appear more pronounced with a shutter speed or frame exposure time of 1/4000 of a second than the first marker 706a appeared with a shutter speed or frame exposure time 1/2000 of a second.

In FIG. 7C, the third picture 702c presents an image with a third object 704c that has a third marker 706c on it, taken with a shutter speed or frame exposure time 1/10000 of a second. The third object 704c may be almost indiscernible from the background. The third marker 706c may appear significantly more pronounced than the other elements in the shot. The markers 706a, 706b, and 706c may not have significantly dimmed from picture to picture, despite the dimming of the rest of the image as a result of a closing aperture stop or increasing the shutter speed. The contrast created by closing the aperture and/or using a higher shutter speed may allow the third marker 706c to be the most distinguishable from its background.

Figure 8A:
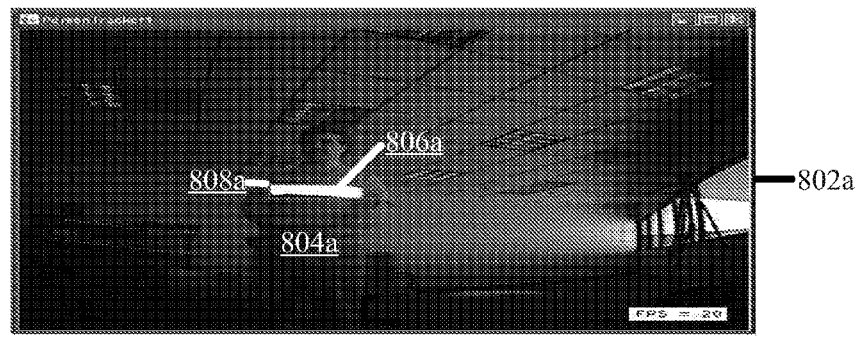
FIGS. 8A-8C illustrate a perspective view of an embodiment of the system for monitoring.
Figure 8B:
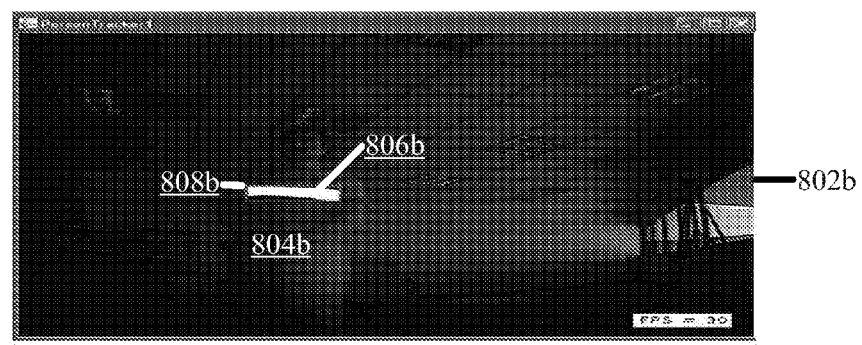
Figure 8C:
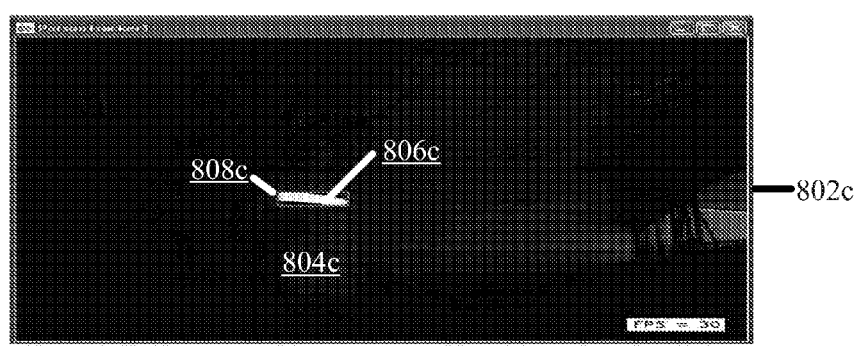

FIGS. 8A-8C illustrate a perspective view of an embodiment of the system for monitoring. In FIGS. 8A-8C, rectangles 808a, 808b and 808c have been placed around markers 806a, 806b and 806c for comparison with the markers. FIGS. 8A-8C are the same as FIGS. 7A-7C except that rectangles have been drawn around the markers. A centroid of the region of the marker may be computed to determine the location of the object. The shape of the marker compared to the rectangle may be used to determine the orientation of the object.

Alternatives and Extensions

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

What is claimed is:

1. A method of monitoring, comprising:
   capturing, with an image capture device, a panoramic view;
   sensing, by an electromagnetic sensor, ambient electromagnetic radiation, associated with the panoramic view, the ambient radiation including at least detecting a particular frequency band reflected from a marker on an object, the electromagnetic sensor being at least one component of a portable electronic device;
   transmitting data about the ambient electromagnetic radiation to a hardware system, the hardware system including at least one memory system and a processor system having at least one processor, the data that is transmitted including at least the particular frequency band reflected from the marker on the object;
   determining, by the processor system of the hardware, data representing the marker within the data about the ambient electromagnetic radiation;
   determining by the processor system of the hardware a location of the object based on the data representing the marker;
   storing in the memory system the data about the ambient electromagnetic radiation from the sensor;
   storing in the memory system the data representing the marker within the data about the ambient electromagnetic radiation;
   storing data generated by the processor regarding the location of the object, based on the data representing the marker location of the object; and
   displaying the data transmitted from the hardware system on the portable electronic device or displaying the data transmitted from the hardware system on another portable electronic device.

2. The method of claim 1, further comprising causing an electromagnetic radiation source to emit the particular frequency band of electromagnetic radiation, sending the particular frequency band of electromagnetic radiation towards the marker, therein causing the marker to reflect the particular frequency band to the sensor.

3. The method of claim 1, the electromagnetic sensor being part of a moving image capture device, the method further comprising tracking motion of the marker by moving the moving image capture device.

4. The method of claim 1, further comprising, tracking the location of the object, with the electromagnetic sensor and the hardware system, from captured image data representing a field of view of one image capture device, to captured image data representing a field of view of a second image capture device, as the object moves from the field of view of one image capture device to the field of view of the other image capture device.

5. The method of claim 4, the hardware system further including a plurality of fixed image capture devices and mobile image capture devices, further comprising:
   instructing, by the hardware system, the moving image capture devices to follow the object; and
   instructing, by the hardware system, to display on a display an image consisting of a smaller range of view than that of a range of view of the fixed image capture device.

6. The method of claim 1, further comprising, transmitting by the hardware system an instruction to an image capture device to optically limit the extent to which the ambient electromagnetic radiation may enter the image capture device, therein increasing the contrast between the marker and other parts of the image.

7. The method of claim 1, further comprising determining, by the hardware system, an orientation of the marker based on comparing a perceived geometric shape of the marker represented by data transmitted from an image capture device and a known shape of the marker.

8. The method of claim 1, further comprising:
   receiving, by the processor system, captured image data representing a first view of the marker from a first image capture device;

receiving, by the processor system, captured image data representing a second view of the marker from a second image capture device;

determining, by the hardware system, the orientation of the marker based on the first view and the second view.

9. A system for monitoring activity, comprising:

an electromagnetic sensor system, wherein the electromagnetic sensor system is at least one component of a portable electronic device, the electromagnetic sensor system including at least one electromagnetic sensor configured to:

detect ambient electromagnetic radiation, including at least a particular frequency band reflected from a marker on an object; and transmit data about the ambient electromagnetic radiation, including at least the particular frequency band reflected from the marker on the object, to a hardware system;

the hardware system, including a processor system and a memory system, the processor system, including at least one processor configured to:

receive the data about the ambient electromagnetic radiation including at least the particular frequency band reflected from the marker on the object, from the sensor;

determine a representation of the marker within the data about the ambient electromagnetic radiation; and determine, a location of the object based on the data representing the marker; and the memory system:

storing the data about the ambient electromagnetic radiation from the sensor;

storing the data representing the marker within the data about the ambient electromagnetic radiation; and storing data generated by the processor regarding the location of the object, based on the data representing the marker location of the object; and the marker; and at least one image capture device configured to offer a panoramic view;

wherein the portable electronic device being configured to display data transmitted from the hardware system or the system for monitoring activity further including at least another portable electronic device being configured to display data transmitted from the hardware system.

10. The system of claim 9, wherein the marker transmits the at least a particular frequency band of electromagnetic radiation.

11. The system of claim 9, wherein the marker selectively reflects at least the particular frequency band of electromagnetic radiation.

12. The system of claim 9, further comprising at least one image capture system including at least one image capture device configured to transmit captured image data to the hardware system.

13. The system of claim 12, wherein at least one of the at least one image capture device is a moves and is configured to adjust a position of the image capture device so that the location of the object based on the data representing the marker transmitted from the hardware system may be positioned at the center of an image represented by the captured image data.

14. The system of claim 9, the at least one image capture device that is configured to offer a panoramic view having a field of view spanning between 90 degrees and 360 degrees.

15. The system of claim 9, further comprising a portable electronic device configured to communicate with the hardware system.

16. The system of claim 9, further comprising a portable electronic device including at least one image capture device, wherein the portable electronic device is configured to transmit captured image data to the hardware system.

17. The system of claim 9, further comprising a server, wherein the hardware system is configured to communicate with the server.

18. The system of claim 9, the processor further configured to determine the whether a patient's activity represents a seizure based on instructions included in an application stored in the memory system, wherein the marker is coupled to a patient in order to track the level of activity of the patient.

* * * * *